United States Patent [19]
Levinson et al.
[11] Patent Number: 4,523,193
[45] Date of Patent: Jun. 11, 1985

[54] REMOTE-CONTROLLED DOORBELL SIGNAL RECEIVER

[76] Inventors: Samuel H. Levinson, 182 Maple Hill Rd., Glencoe, Ill. 60022; Jack R. Caldicott, 28461 W. Kelsey Ct., Barrington, Ill. 60010

[21] Appl. No.: 553,974

[22] Filed: Nov. 21, 1983

[51] Int. Cl.[3] .......................... H04Q 9/00; H04B 1/00; G08B 27/00

[52] U.S. Cl. .............................. 340/825.69; 340/326; 340/384 R

[58] Field of Search ....................... 340/825.69, 825.72, 340/696, 311.1, 326, 825.48, 815.22, 384, 332, 384 R; 179/2 EC, 2 A; 358/86

[56] References Cited

U.S. PATENT DOCUMENTS 3,184,727 5/1965 Miessner .
3,544,987 12/1970 McMann, Jr. et al. .
3,795,896 3/1974 Isaacs .
3,821,707 6/1974 Peters .
4,021,728 3/1977 Fowler .
4,243,973 1/1981 Sandidge ........................ 340/815.22
4,316,273 2/1982 Jetter .............................. 340/825.69
4,370,675 1/1983 Cohn .................................... 358/86

FOREIGN PATENT DOCUMENTS 962146 2/1962 United Kingdom ........... 340/825.48

*Primary Examiner*—Donald J. Yusko
*Attorney, Agent, or Firm*—George H. Gerstman

[57] ABSTRACT

A remote-controlled doorbell adapted for connection across the existing doorbell in a building having a wired doorbell system. A transmitter for generating an over-the-air radio signal is coupled across the wired doorbell so that the transmitter will be actuated in response to current flowing through the wired doorbell. A remote receiver coupled to sound producing means receives the over-the-air radio signal and actuates the sound producing means when the existing doorbell is energized.

9 Claims, 2 Drawing Figures

REMOTE-CONTROLLED DOORBELL SIGNAL RECEIVER

BACKGROUND OF THE INVENTION

The present invention concerns a novel remote-controlled doorbell.

The conventional doorbell in buildings (i.e., residences, offices, factories, etc.) throughout the United States and elsewhere is hard wired and ordinarily installed during construction of the building. Typically the household current, for example, 110 volts AC, is stepped down by a transformer to approximately 12 volts. The bell is connected in circuit with the transformer secondary and generally a push-button switch is operated by the person seeking admittance to the building. When the doorbell switch is closed, current passes through the bell to energize it and a sound is emitted. Although the term "bell" is used, typically the sounding device may be a chime, buzzer or many other types of sound-emitting means.

It has been found that there is a significant need for the provision of a doorbell in various locations about a building, such as a residence, in addition to the typical location of a doorbell adjacent the main entry. For example, the location of a doorbell in the basement or in the back yard of a residence has been found to be desirable. However, the additional wiring that is necessary for providing a doorbell in these other locations has been a severely limiting factor, in view of its expense and difficulty of application.

It is, therefore, an object of the present invention to provide a doorbell that can be located at various locations throughout a building, without the need to provide additional wiring to the location.

Another object of the present invention is to provide one or more additional doorbells which can be utilized in conjunction with the existing doorbell switch, but can be placed at selected locations throughout the building.

A further object of the present invention is to provide a remote-controlled doorbell which is simple in construction and easy to install.

A still further object of the present invention is to provide a remote-controlled doorbell that can be easily attached to the existing wired doorbell system, but allows the remote-controlled doorbell to be placed at selected locations.

Other objects and advantages of the present invention will become apparent as the description proceeds.

BRIEF DESCRIPTION OF THE INVENTION

In accordance with the present invention, a doorbell is provided for enabling a sound in a selected location in response to the actuation of a doorbell switch. The doorbell comprises a transmitter for generating an over-the-air radio signal, means for actuating the transmitter when a doorbell switch is operated, a remote receiver for receiving the radio signal and for providing a predetermined output in response to receipt of the radio signal, and sound producing means coupled to the output of a remote receiver for providing a sound in response to the predetermined output from the remote receiver.

In the illustrative embodiments, the actuating means comprises means for coupling the transmitter across the existing bell of an existing wired doorbell, and rectifier means are provided for rectifying the alternating current in the existing doorbell and for providing direct current to the transmitter.

In the illustrative embodiments, the actuating means include a current limiting resistance, a voltage limiting means and filter means.

In the illustrative embodiments, the sound producing means comprises a tone generator connected to the output of the receiver and a speaker is connected to the output of the tone generator.

A more detailed explanation of the invention is provided in the following description and claims, and is illustrated in the accompanying drawing.

DETAILED DESCRIPTION OF THE ILLUSTRATIVE EMBODIMENT

Figure 1:
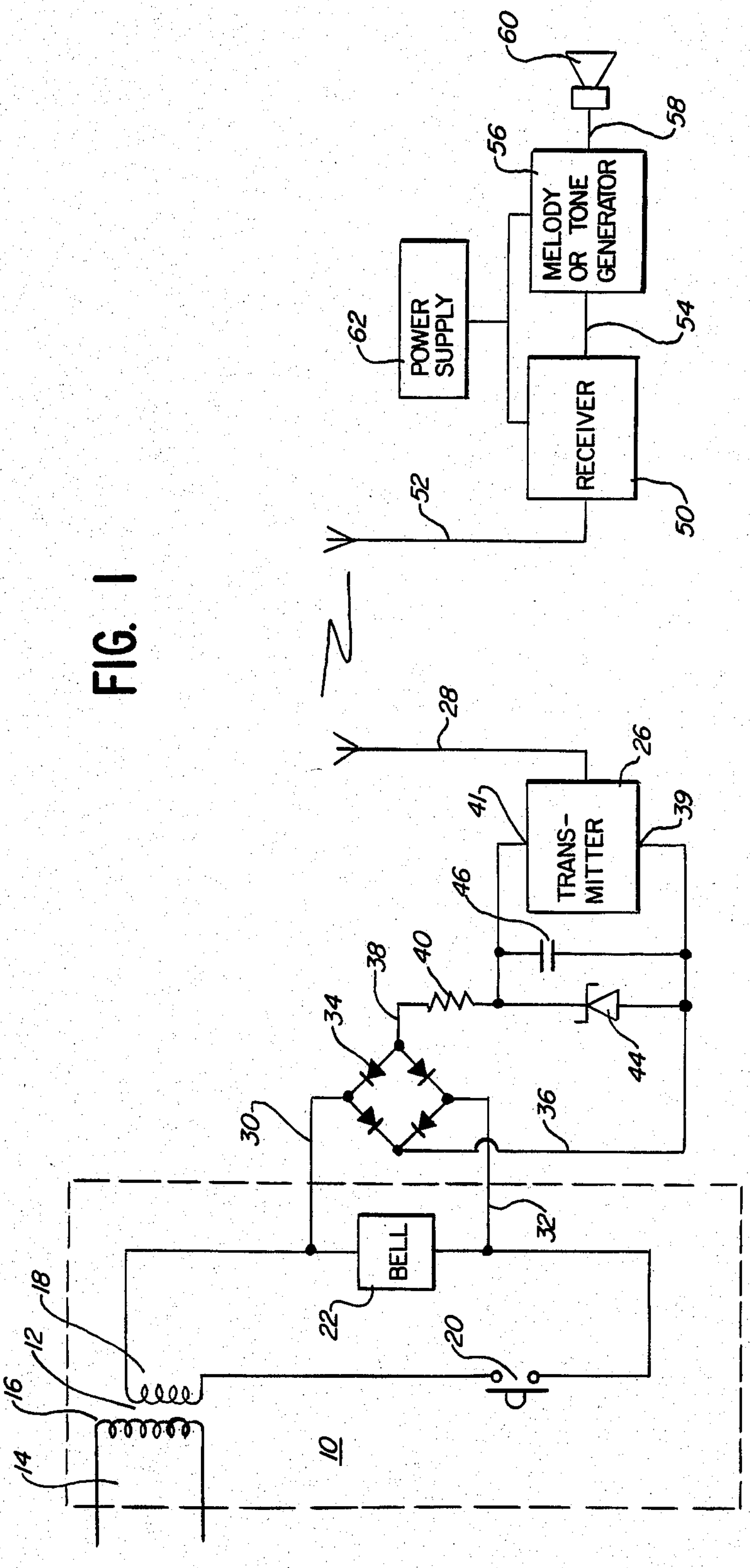
FIG. 1 is a schematic block diagram of a remote-controlled doorbell constructed in accordance with the principles of the present invention.

Referring to FIG. 1, a schematic block diagram is shown including an existing wired doorbell system 10. The existing wired doorbell system comprises a step down transformer 12 coupling the household alternating current supply 14 to primary 16. The secondary 18 of transformer 12 is connected in series with push-button doorbell switch 20 and the doorbell 22, which may comprise a bell, buzzer, chimes, tone generator, or any other sound producing means known in the art. Thus when doorbell switch 20 is operated, doorbell 22 will be energized to emit a sound.

The remote-controlled doorbell of the present invention comprises a conventional radio transmitter 26 which preferably transmits in the 49 megahertz band. Transmitter 26 carries an antenna 28. The transmitter 26 is coupled across the doorbell 22 by means of leads 30 and 32 which are physically attached on opposite sides of the doorbell as illustrated. Leads 30 and 32 are connected to the input side of a full wave rectifier 34, with output lead 36 being connected to the positive terminal 39 of transmitter 26 and output lead 38 being connected through current limiting resistor 40 to the negative terminal 41 of transmitter 26. A zener diode is provided as illustrated for regulating the voltage for the transmitter and a capacitor 46 is provided as illustrated as a filter capacitor.

The remote-controlled doorbell of the present invention comprises at least one receiver 50, carrying antenna 52. Receiver 50 is tuned to receive the signal transmitted by transmitter 26. The receiver output signal is fed via line 54 to a melody synthesizer or tone generator 56, the output 58 of which is connected to a speaker 60. Melody synthesizer 56 may comprise any conventional melody synthesizer known in the art, although a specific example (with no limitation being intended) is the AY-3-1350 melody synthesizer IC sold under the trademark ARCHER, Catalog No. 276-1782 by Radio Shack, a division of Tandy Corporation, Fort Worth, Tex. 76102.

The receiver 50 and melody synthesizer 56 are powered by a power supply 62 which may be a battery or may be the stepped down voltage from the household current supply.

It is preferred that receiver 50, antenna 52, melody synthesizer 56, speaker 60 and a battery 62 all be enclosed in a small, plastic housing. In this manner, the housing with its internal components may easily be placed in any selected location throughout the residence or elsewhere, so long as it is within receiving range of the radio signal transmitted by transmitter 26. Likewise, if a battery power source is not utilized, the housing may have means for connecting the housing directly to a household current supply by simple plug-in.

Although only a single receiver, melody synthesizer, speaker and power supply is illustrated, a number of these composite items may be utilized with a single transmitter. In that manner, a single transmitter may be coupled across an existing wired doorbell and a number of receiver-melody synthesizer-speaker-power supply units can be placed in strategic locations throughout the residence. For example, one may be placed in the basement, one may be placed in the backyard, one may be placed in the kitchen, etc.

Thus when doorbell switch 20 is operated, wired doorbell 22 will be energized to emit a sound. When bell 22 is energized, the voltage across bell 22 will energize transmitter 26 to transmit a signal that is received by receivers 50. All of the receivers 50 with their associated melody synthesizers 56 and speakers 60 will be actuated to emit sounds wherever they are located, thus providing remote-controlled doorbells, for example, in the basement, backyard, kitchen or any other place where the units are located.

Figure 2:
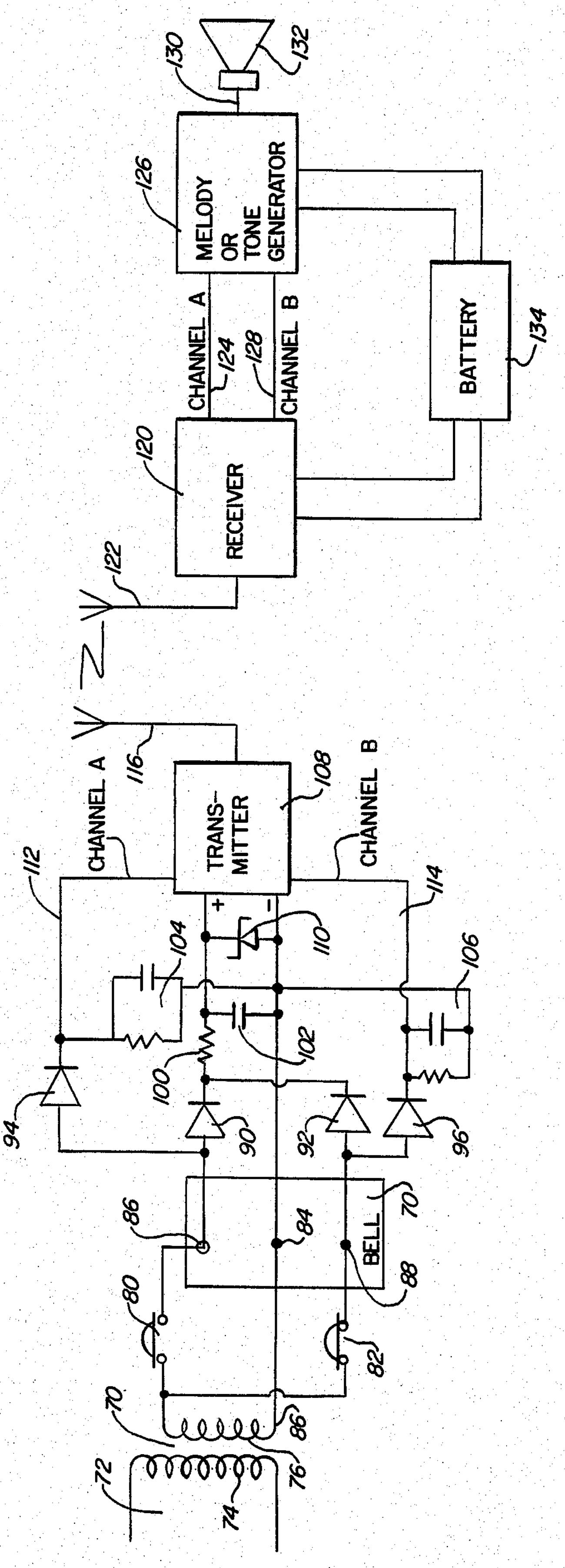
FIG. 2 is a schematic block diagram of a modified form of the remote-controlled doorbell of FIG. 1.

In FIG. 2, a schematic block diagram illustrates the present invention as applied to an existing wired doorbell system in which the front door switch actuates one tone while the back door switch actuates another tone. In many households, for example, the front door switch actuates a double chime while the back door switch actuates a single chime.

In FIG. 2, the existing wired doorbell system comprises a step down transformer 70 coupling the household alternating current supply 72 to primary 74. The secondary 76 of transformer 70 is connected to existing doorbell 78 through front door switch 80 or, alternately, through back door switch 82. Doorbell 78 is the conventional type having three terminals, with the center terminal 84 connected to the side 86 of secondary 76 other than the side to which switches 80 and 82 are connected.

Front door switch 80 is connected to terminal 86 while back door switch 82 is connected to terminal 88 of bell 78. Terminal 86 is connected to the anode of diode 90 and terminal 88 is connected to the anode of diode 92. Terminal 86 is also connected to the anode of diode 94 while terminal 88 is also connected to the anode of diode 96. Diodes 90 and 92 form half wave rectifiers powered by the operation of switch 80 or switch 82.

Connected to the anodes of diodes 90 and 92 are current limiting resistor 100 and filter capacitor 102. Resistor-capacitor circuit 104 is connected to the anode of diode 94 and resistor-capacitor circuit 106 is connected to the anode of diode 96.

A transmitter 108 is provided and is coupled to the anodes of the diodes as indicated. A zener diode 110 is connected across the transmitter inputs for regulating the voltage for the transmitter.

Although no limitation is intended, as an illustrative example transmitter 108 could comprise transmitter type LM1871, manufactured by National Semiconductor. Transmitter 108 provides multi-channel transmission, so that when front door switch 80 is operated, a signal will be sent via line 112 to transmitter 108 to transmit a first (channel A) signal. Likewise, when rear door switch 82 is operated, a signal on line 114 will be fed to transmitter 108 causing transmitter 108 to transmit a second (channel B) signal. Transmitter 108 carries an antenna 116.

A receiver 120 carrying antenna 122 is positioned in a desired location, at a distance where it can receive signals from transmitter 108. Although no limitation is intended, receiver 120 may comprise a model LM1872 receiver, manufactured by National Semiconductor. This is a multi-channel receiver which, upon receiving the first signal, transmits a signal on line 124 to melody or tone generator 126. Likewise, if receiver 120 receives the second signal, it transmits a signal on line 128 to melody or tone generator 126. Tone generator 126 produces a particular tone depending upon the selected input and the appropriate waveform is fed via line 130 to speaker 132.

Receiver 120 and tone generator 126 are powered by power supply 134 which, as illustrated, is a battery supply. However, the power supply may be the stepped down voltage from the household current supply, if desired.

Although illustrative embodiments of the invention have been illustrated and described, it is to be understood that various modifications and substitutions may be made by those skilled in the art without departing from the novel spirit and scope of the present invention.

What is claimed is:

1. A doorbell system for providing a sound in a selected location having a wired doorbell system, in response to the actuation of an existing doorbell switch that is positioned adjacent to a door, which comprises:
- a transmitter for generating an over-the-air radio signal;
- means for actuating said transmitter when the doorbell switch is operated;
- said actuating means comprising means for coupling the transmitter across the existing bell of the existing wired doorbell, and rectifier means for rectifying the alternating current in the existing doorbell and providing direct current to the transmitter;
- a remote receiver for receiving said radio signal and for providing a predetermined output in response to receipt of said radio signal; and
- sound producing means coupled to the output of said remote receiver for providing a sound in response to said predetermined output from said remote receiver.

2. A doorbell as described in claim 1, said actuating means including a current limiting resistance, a voltage limiting means and filter means.

3. A doorbell as described in claim 1, including a battery for powering the remote receiver.

4. A doorbell as described in claim 1, said sound producing means comprising a tone generator and a speaker connected to the output of the tone generator.

5. A doorbell as described in claim 1, said actuating means comprising means for actuating said transmitter in said existing mode when a first doorbell switch is operated and means for actuating said transmitter in a second mode when a second existing doorbell switch is operated; said remote receiver operating to receive a first radio signal when said transmitter is in said first mode and a second radio signal when said transmitter is in its second mode, said remote receiver being operable for providing a first predetermined output in response to receipt of said first radio signal and a second predetermined output in response to receipt of said second radio signal; and said sound producing means being operative for providing a first sound in response to said first predetermined output and a second sound in response to said second predetermined output.

6. A system for providing a remote-controlled doorbell in a building having a wired doorbell system, which comprises the steps of:

providing a transmitter for generating an over-the-air radio signal;

coupling the transmitter across the wired doorbell so that the transmitter will be actuated in response to current flowing through the circuit;

providing a remote receiver for receiving the radio signal; and providing sound producing means for producing a sound in response to receipt of the radio signal from the transmitter by the remote receiver.

7. A system as described in claim 6, including the step of providing, intermediate the wired doorbell and the transmitter, rectifier means for rectifying the alternating current in the wired doorbell to provide direct current to the transmitter, a current limiting resistance at the output of the rectifier means, a voltage limiting means and filter means.

8. A system for providing a remote-controlled doorbell in a building having a wired doorbell system, which comprises the steps of:

providing a transmitter for generating a first over-the-air radio signal and a second over-the-air radio signal;

coupling the transmitter across the wired doorbell so that the transmitter will be actuated in response to current flowing through the wired doorbell, to provide said first over-the-air radio signal if a first switch is actuated and to provide said second over-the-air radio signal if said second switch is actuated;

providing a remote receiver for receiving said first and second radio signals; and providing sound producing means for producing a first sound in response to receipt of said first radio signal from the transmitter by the remote receiver and for producing a second sound in response to receipt of the second radio signal from the transmitter by the remote receiver.

9. A door signal system for use in a building having an existing wired doorbell system, which comprises:

a transmitter for generating a first over-the-air signal and a different, second over-the-air signal;

means for actuating said transmitter to generate said first over-the-air signal when a first doorbell switch is operated;

means for actuating said transmitter to generate said second over-the-air signal when a second doorbell switch is operated;

a remote receiver for receiving said first and second over-the-air signals, said remote receiver being operative to provide a first predetermined output in response to said first over-the-air signal and to provide a second predetermined output in response to said second over-the-air signal; and means coupled to the output of said remote receiver for providing a first sound in response to said first predetermined output and for providing a second, different sound in response to said second predetermined output.

* * * * *